N. O. BOND.
Wash-Stands.

No. 197,714.          Patented Dec. 4, 1877.

WITNESSES
Saml R Turner
Thos D A Durant

INVENTOR
Nathan O Bond
by B.C. Pole & Co.
ATTORNEY

UNITED STATES PATENT OFFICE.

NATHAN O. BOND, OF FAIRFAX COURT-HOUSE, VIRGINIA.

IMPROVEMENT IN WASH-STANDS.

Specification forming part of Letters Patent No. 197,714, dated December 4, 1877; application filed October 9, 1877.

*To all whom it may concern:*

Be it known that I, NATHAN O. BOND, of Fairfax Court-House, in the county of Fairfax and State of Virginia, have invented certain new and useful Improvements in Wash-Stands; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
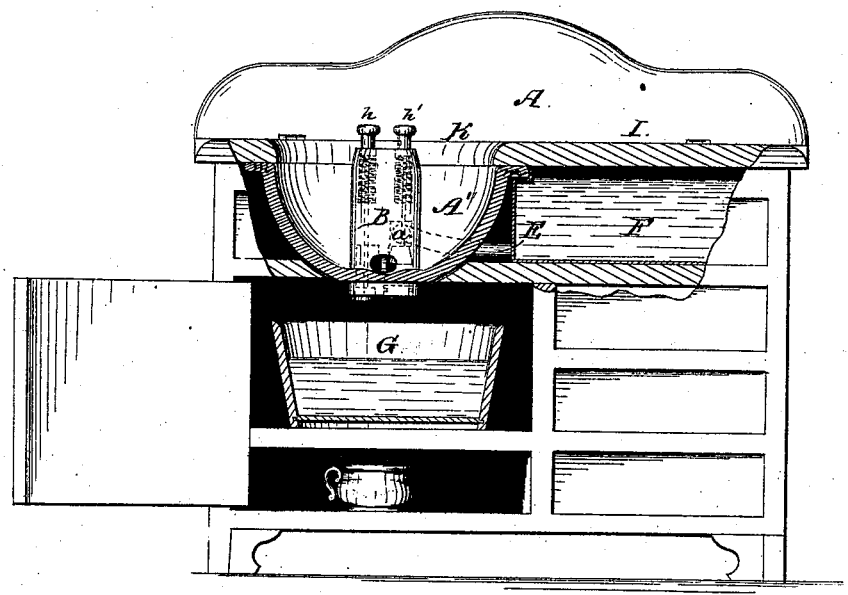
Figure 2:
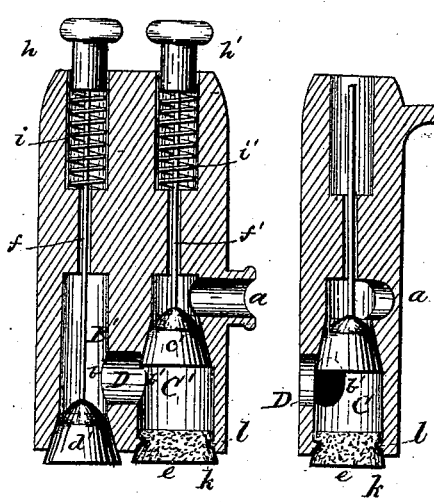
Figure 3:
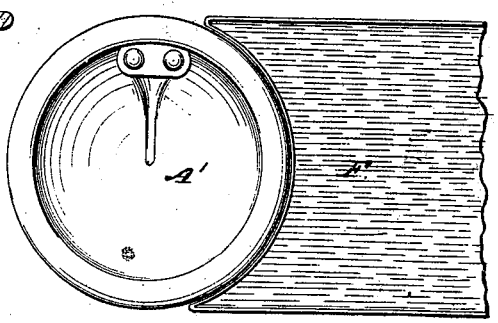

Figure 1 is a sectional elevation; Fig. 2, a longitudinal section of valve-chambers, and Fig. 3 a plan view of bowl and reservoir.

This invention has relation to wash-stands; and the novelty consists in constructing a wash-bowl with a valve-chamber having suitable inlet and outlet openings, all formed in one piece.

It further consists in placing the bowl, constructed as above, beside a reservoir, which is connected therewith by a tube made of rubber or some other suitable material, thus forming a part of the wash-stand.

In the annexed drawings, A represents the wash-stand, and A' the bowl, made of earthen, terra-cotta, or any other suitable material, to one side of which is attached a piece, B, provided with the valve-chambers B' C'.

In constructing the wash-bowl the valve-chambers B' C' are formed therewith, thereby making the article in one piece, which may be made in a mold or struck up in any of the well-known ways of forming earthenware.

By uniting or forming the valve-chambers with the wash-bowl, all seams and joints are avoided.

The valve-chambers B' C', near their lower ends, are provided with openings $b$ $b'$, which establish communication with the horizontal passage D. In the chamber C, above the valve $c'$, is an opening, $a$, which connects with a supply-pipe, E, and conducts the water from the reservoir to the wash-bowl.

F is the reservoir, made in the upper part of the wash-stand, and is provided with a lid having an opening, K, about the same size as the inside of the mouth of the wash-bowl, and immediately over the latter, so that the reservoir is covered, for the purpose of keeping dirt, dust, &c., out of the water.

At the bottom of chamber B' is a valve, $d'$, for the purpose of discharging waste-water from the bowl; and the bottom of chamber C' is provided with a flaring stopper, $e$, which may be made of rubber or any other suitable material, and which is provided with a groove, $k$, which receives a flange, $l$, on the inside of the chamber C', to hold the stopper or plug $e$ in place. The plug $e$, being elastic, needs only to be forced into place by pressing upon it; and it may be readily withdrawn to remove the valve $c'$ when it is necessary to make repairs.

$f$ $f'$ represent the connecting-rods, with valves, for the purpose of opening and closing the same. $h$ $h'$ are the presser-knobs, which may be screwed or unscrewed at will; and $i$ $i'$, the spiral springs used for the purpose of throwing the valves into position.

The stem-valves $d'$ $c'$ establish the water communication by operating the valves. The water communication is established between the inlet and outlet openings to the bowl. The valve $d'$ is operated for the purpose of discharging the water.

It will be observed that the opening in the valve-chambers is on a line with the bottom of the wash-bowl. The bowl A' is placed beside the reservoir F, and its discharge-valve leads to the receptacle G, in which an ordinary utensil is placed for the purpose of receiving the waste-water.

The covered reservoir F has a shoulder, $m$, for the purpose of acting as a support or rest to the bowl A', as shown in Fig. 1.

Operation: To let water into the wash-bowl, the spring stem-valve $c'$ is depressed so that the valve will pass below the mouth of the opening $a$, thereby allowing the water to flow freely from the water-supply to the bowl.

When it is desired to discharge the used water in the bowl the spring stem-valve $d'$ is depressed, which throws the valve from its seat, and allows the water to escape at the bottom of the chamber B'.

After the hand has been removed from the knobs, the valves are returned to their normal position by means of springs $i$ $i'$.

Having thus described my invention, what

I claim as new, and desire to secure by Letters Patent, is—

1. The covered reservoir F, having a shoulder, m, to form a support or rest for the stationary wash-bowl A', substantially as and for the purpose set forth.

2. The combination, with a wash-bowl, of the valve-chambers B' C', provided with spring stem-valves c' d', and inlet and outlet water-passages b b', substantially as and for the purpose specified.

3. In a wash-stand, the covered reservoir F, in combination with a wash-bowl, A', having valves c' d', and pipe E, substantially as and for the purpose specified.

4. In combination with a wash-stand having the reservoir F and wash-bowl A', the valve-chambers C', having the internal flange l and the flaring plug e, provided with the groove k, substantially as set forth.

NATHAN O. BOND.

Witnesses:
 THOS. D. D. OURAND,
 SAML. R. TURNER.